United States Defensive Publication [19] (H) [11] T101,903

Dombroski [43] Jun. 1, 1982

[54] FREE RADICAL PROMOTER FOR CURING POLYESTER COMPOSITIONS

[76] Inventor: John R. Dombroski, 2608 Brighton Ct., Kingsport, Tenn. 37660

[21] Appl. No.: 257,448

[22] Filed: Apr. 24, 1981

[51] Int. Cl.[3] ..... C08L 67/06

[52] U.S. Cl. ..... 525/17; 525/43; 525/44

[57] ABSTRACT

Free radical promoters for use in curing resin compositions comprising an unsaturated polyester and an ethylenically unsaturated copolymerizable monomer are disclosed for use with conventional initiators. The free radical promoters comprise ferrocene or ferrocene substituted on one or both cyclopentadienyl rings with an alkyl, alkoxy, hydroxyl, carboxyl, carboxaldehyde, hydroxyalkyl, amino, halo, cycloalkyl, or aryl radical.

5 Claims, No Sheets Drawing,

20 Pages Specification

The file of this unexamined application may be inspected and copies thereof may be purchased (849 O.G. 1221, Apr. 9, 1968).